US007809391B2

(12) United States Patent
Kwon

(10) Patent No.: US 7,809,391 B2
(45) Date of Patent: Oct. 5, 2010

(54) OPTIMIZING TALK BURST CONTROL PROCESS IN A PTT COMMUNICATION NETWORK

(75) Inventor: Oh-Ae Kwon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 974 days.

(21) Appl. No.: 11/201,679

(22) Filed: Aug. 10, 2005

(65) Prior Publication Data
US 2006/0040685 A1 Feb. 23, 2006

(30) Foreign Application Priority Data
Aug. 11, 2004 (KR) ...................... 10-2004-0063244

(51) Int. Cl.
*H04B 7/00* (2006.01)
(52) U.S. Cl. ...................... 455/519; 455/518; 455/520; 455/521
(58) Field of Classification Search .......... 455/515–519
See application file for complete search history.

(56) References Cited
U.S. PATENT DOCUMENTS
7,417,989 B1 * 8/2008 Doran ........................ 370/390

| 7,561,528 | B2 * | 7/2009 | Huh et al. | 370/252 |
|---|---|---|---|---|
| 2003/0078064 | A1 * | 4/2003 | Chan | 455/514 |
| 2005/0124365 | A1 * | 6/2005 | Balasuriya et al. | 455/518 |
| 2005/0141541 | A1 * | 6/2005 | Cuny et al. | 370/437 |
| 2005/0192041 | A1 * | 9/2005 | Oxley et al. | 455/519 |
| 2005/0227657 | A1 * | 10/2005 | Frankkila et al. | 455/255 |

FOREIGN PATENT DOCUMENTS
WO WO 03036801 5/2003

* cited by examiner

*Primary Examiner*—Edward Urban
*Assistant Examiner*—Fayyaz Alam
(74) *Attorney, Agent, or Firm*—Lee, Hong, Degerman, Kang & Waimey

(57) ABSTRACT

A push-to-talk (PTT) method for optimizing talk burst control in a PTT communication network is provided. The method comprises transmitting a talk burst inquiry from a first PTT terminal to a PTT server requesting a talk burst control message to determine a talk burst state of the first PTT terminal; and receiving from the PTT server the talk burst control message providing the talk burst state of the first PTT terminal, in response to the talk burst inquiry, wherein the talk burst state indicates whether a talk burst request is granted to a second PTT terminal.

25 Claims, 3 Drawing Sheets

FIG. 1

| V=2 | P | SUBTYPE (00111) | PT=APP=204 | LENGTH |
|---|---|---|---|---|
| SSRC OF UE ||||||
| NAME=PoC1 ||||||

OPTIMIZING TALK BURST CONTROL PROCESS IN A PTT COMMUNICATION NETWORK

CROSS REFERENCE TO RELATED APPLICATIONS

Pursuant to 35 U.S.C. §119(a), this application claims the benefit of earlier filing date and right of priority to Korean Patent Application No. 2004-063244, filed on Aug. 11, 2004, the content of which is hereby incorporated by reference herein in its entirety.

FIELD OF THE INVENTION

The present invention relates to a PTT (Push to Talk) communication network, and more particularly to a method of optimizing talk burst control in the PTT communication network.

BACKGROUND OF THE INVENTION

PTT service is a real-time wireless communication service for providing instant connection and communication between terminals connected to a PTT network. In comparison with a general mobile communication service that requires a dial-up interface for connecting the communicating parties, in a PTT communication network, a user can communicate with other users by pressing a talk button of a PTT communication terminal without having to wait for a dial tone or a series of rings before the call is connected.

In a PTT network, a user can communicate voice or data over a point-to-point connection. Alternatively, a single message can be communicated to a group of PTT terminals connected to the PTT network.

PoC (Push-to-Talk Over Cellular) is a PTT service applied to a PTT terminal connected to a PTT communication network. A PTT server is used for controlling transmission of voice and data between PTT terminals and providing a variety of PTT services.

To communicate over a PTT communication network, a PTT terminal typically establishes a session with another PTT terminal connected to the PTT network through the PTT server. The PTT terminals transmit and receive voice and data over a Real Time Transport Control Protocol (RTCP).

A PTT terminal can store information of other terminals participating in the PTT service. Information such as identification data, CNAME (Canonical NAME), and NAME of PTT terminals participating in a PTT service is stored in storage media (e.g., memory) of the PTT terminals.

Accordingly, a PTT terminal receives a talk burst control message (also referred to as a floor control message) from the PTT server, and communicates a RTP (Real-time Transport Protocol) to another PTT terminal through the PTT server. That is, the PTT terminal requests a talk burst and waits to receive permission from the PTT server to transmit a voice or data message. In the related art systems, a talk burst indication is transmitted by a PTT server to all PTT terminals except for the PTT terminal that have received the permission to communicate to indicate that a permission to send a talk burst is taken by another PTT terminal.

Due to network characteristics and other unforeseen circumstances, it is possible that the talk burst indication sent from the PTT server to a PTT terminal is lost during transmission. In this scenario, a PTT terminal that receives a RTP packet from the sending PTT terminal without having received a talk burst indication will be unable to display the user name of the sending PTT terminal.

Typically, a PTT terminal that receives the RTP packet processes the identification data of the transmitting PTT terminal included in the RTP packet to determine the identity of the transmitting PTT terminal. The identification data is stored in a SSRC (Synchronization Source) field of the RTP packet. The receiving PTT terminal compares this identification data with information stored in memory of the PTT terminal. Accordingly, CNAME and NAME of the transmitting PTT terminal are determined and displayed on the receiving PTT terminal, if the matching information is found.

The above-mentioned implementation is disadvantageous because it requires a PTT terminal to have a high capacity memory or storage medium to store the identifying information for every PTT terminal participating in a PTT service. Further, since the identifying information and the related data are communicated between all PTT terminals connected to the PTT network, the system load will increase. This is because managing an RTP session with another PTT terminal RTCP packets will have to be processed between all PTT terminals.

Unfortunately, the related art methods do not provide a remedy when a talk burst control message communicated between a PTT terminal and a PTT server is lost. This degrades the reliability and quality of PTT service. A system or method is needed to overcome the above problems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a push-to-talk (PTT) method for optimizing talk burst control in a PTT communication network is provided. The method comprises transmitting a talk burst inquiry from a first PTT terminal to a PTT server requesting a talk burst control message to determine a talk burst state of the first PTT terminal; and receiving from the PTT server the talk burst control message providing the talk burst state of the first PTT terminal, in response to the talk burst inquiry, wherein the talk burst state indicates whether a talk burst request is granted to a second PTT terminal.

In one embodiment, the talk burst control message comprises identity of the second PTT terminal. The first PTT terminal receives a real time protocol (RTP) packet transmitted by the second PTT terminal. The RTP packet comprises a synchronization source (SSRC) field. The RTP packet is processed by the PTT server before the RTP packet is received by the first PTT terminal, so that the SSRC field of the RTP packet is changed by the PTT server from a first value to a second value.

The first value is an identification generated by the PTT server. The second value is an identification provided by the second PTT terminal. The talk burst inquiry is transmitted by the first PTT terminal, when the first PTT terminal receives a communication from the second PTT terminal. The talk burst inquiry is transmitted by the first PTT terminal, when the first PTT terminal receives a communication from the second PTT terminal without having received a talk burst indication message from the PTT server.

In accordance with another aspect of the invention, a PTT service method for optimizing talk burst control in a PTT system in which a session is established between one or more PTT terminals and a PTT server is provided. The method comprises transmitting a talk burst control message to a first PTT terminal, in response receiving a talk burst inquiry; and changing identification data of the PTT server into identification data of a second PTT terminal upon reception of a RTP packet from the second PTT terminal.

In one embodiment, the changed identification data is transmitted to the first PTT terminal. The talk burst control message is one of a talk burst taken, a talk burst granted and a talk burst idle. The identification data is stored in a SSRC field of the RTP packet.

In accordance with a preferred embodiment, a push-to-talk (PTT) method for optimizing talk burst control in a PTT communication network comprises receiving a talk burst inquiry from a first PTT terminal requesting a talk burst control message to determine a talk burst state of the first PTT terminal; and sending to the first PTT terminal the talk burst control message providing the talk burst state of the first PTT terminal, in response to the talk burst inquiry, wherein the talk burst state indicates whether a talk burst request is granted to a second PTT terminal.

The talk burst control message comprises identity of the second PTT terminal. The first PTT terminal a real time protocol (RTP) packet transmitted by the second PTT terminal. The RTP packet comprises a synchronization source (SSRC) field. The RTP packet is processed by the PTT server before the RTP packet is received by the first PTT terminal, so that the SSRC field of the RTP packet is changed by the PTT server from a first value to a second value. The first value is an identification generated by the PTT server. The second value is the identity of the second PTT terminal. In one embodiment, the talk burst inquiry is transmitted by the first PTT terminal, when the first PTT terminal receives a communication from the second PTT terminal without having received a talk burst indication message from the PTT server.

In accordance with another preferred embodiment, a PTT terminal comprises means for transmitting a talk burst inquiry to a PTT server requesting a talk burst control message to determine a talk burst state; and means for receiving from the PTT server the talk burst control message providing the talk burst state, wherein the talk burst state indicates whether a talk burst request is granted to a second PTT terminal.

The PTT terminal may further comprise means for receiving a real time protocol (RTP) packet transmitted by the second PTT terminal. The RTP packet is processed by the PTT server before the RTP packet is received, so that the SSRC field of the RTP packet is changed by the PTT server from a first value to a second value.

These and other embodiments of the present invention will also become readily apparent to those skilled in the art from the following detailed description of the embodiments having reference to the attached figures, the invention not being limited to any particular embodiments disclosed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 is a block diagram illustrating a structure of a talk burst inquiry message in accordance with one embodiment of the present invention.

Features, elements, and aspects of the invention that are referenced by the same numerals in different figures represent the same, equivalent, or similar features, elements, or aspects in accordance with one or more embodiments of the system

DETAILED DESCRIPTION OF THE PREFERRED EMBODIMENTS

Figure 2:
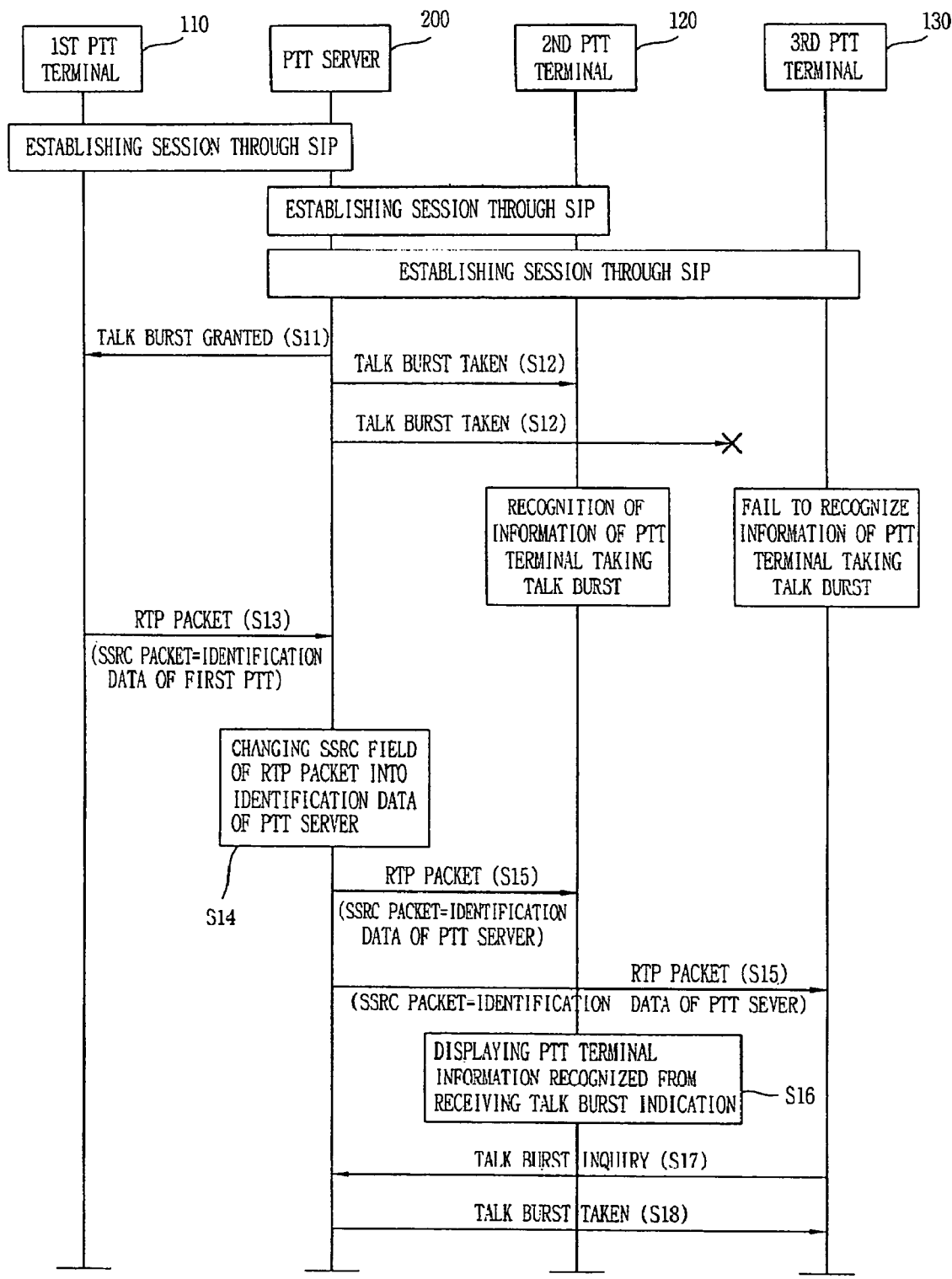
FIG. 2 is a flow diagram showing a PTT service method in accordance with one embodiment of the present invention.

Reference will now be made in detail to the preferred embodiments of the present invention, examples of which are illustrated in the accompanying drawings. In accordance with one aspect of the present invention, a talk burst request is sent by a PTT terminal to a PTT server to receive a talk burst control message. If the PTT terminal is in a no-service area or the talk burst control message transmitted from the PTT server is lost, the synchronization between the PTT terminal and the PTT server is lost.

A PTT server transmits a talk burst control message corresponding to a state of the PTT terminal, in case of receiving the talk burst request from the PTT terminal. The PTT terminal changes a SSRC field value of a RTP packet into a SSRC field value stored in the PTT terminal. The PTT terminal then transmits the changed SSRC field value. As such, the PTT terminals participating in a communication session do not have to manage SSRC field values of other PTT terminals.

In a preferred embodiment, a talk burst control message is communicated between a PTT server and one or more PTT terminals. Depending on implementation, a variety of talk burst status messages can be communicated. For example, when a PTT terminal sends a talk burst request to the PTT server, a talk burst grant message is sent from the PTT server to the requesting PTT terminal providing the PTT terminal with the permission to send a talk burst.

In one embodiment, a talk burst taken message (i.e., a talk burst indication) is transmitted to a plurality of PTT terminals (except the terminal with the permission to send the talk burst) to indicate that the talk burst permission has been granted to another terminal. The talk burst taken message may also provide the identity of the terminal having the permission to communicate.

If the server rejects a talk burst request, a talk burst deny message is transmitted to the PTT terminal requesting the talk burst. When sending of the talk burst is completed, a talk burst release is sent by the PTT terminal to the PTT server. In certain embodiments, a talk burst idle is transmitted by the PTT sever to a plurality of PTT terminals in order to indicate no requests for a talk burst are pending. In order to revoke the permission to talk, a talk burst revoke may be sent by the PTT server to the PTT terminal already granted a talk burst.

In one embodiment, a talk burst control message is transmitted over a User Datagram Protocol (UDP) and an RTP control protocol (RTCP) in real-time. Depending on network conditions, a talk burst control message may be lost during transmission. If the talk burst control message is lost, a talk burst inquiry may be transmitted to the PTT server by a PTT terminal as provided below.

Referring to FIG. 1, the structure of a talk burst inquiry in accordance with an exemplary embodiment of the present invention is illustrated. The talk burst inquiry may be a RTCP packet like other talk burst control messages. As shown, the talk burst inquiry comprises a first field (e.g., V) defining a RTP version, a second field (e.g., P) indicating whether one or more padding bits are included, a subtype field defining the talk burst inquiry, a packet type field (e.g., PT) defining an application packet of the RTCP, a length field defining a length of final data from the SSCR, a SSCR field defining synchronization of a PTT terminal transmitting the talk burst inquiry, and a name field.

The name field can be changed depending on the service provider that provides the PTT service. Each talk burst control message transmitted and received between the PTT server and a PTT terminal is distinguished based on the value of the subtype field. In an exemplary embodiment, the subtype field of the talk burst inquiry can be defined as '00111'. In one embodiment, the PTT server receives the talk burst inquiry and transmits the talk burst control message that corresponds to a present state of the PTT terminal to the PTT terminal.

Referring to FIG. 2, a signal flow chart showing an embodiment of a PTT service method in accordance with one embodiment of the present invention is provided. As shown, an exemplary PTT communication network comprises a first PTT terminal 110, a second PTT terminal 120, a third PTT terminal 130 and a PTT server 200. The PTT server 200 is configured for managing communication sessions between the PTT terminals 110, 120 and 130. Sessions between the first PTT terminal 110, the second PTT terminal 120 and the third PTT terminal 130 are established through the PTT server 200.

If the first PTT terminal 110 receives a permission from the server 200 to send a talk burst, the other PTT terminals do not transmit and receive RTCP packets to and from each other. In one embodiment, each PTT terminal is not required to store information such as identification data, CNAME and NAME of every terminal participating in the PTT service.

In accordance with one aspect of the invention, after a communication session has been established, the PTT server 200 transmits a talk burst grant to the first PTT terminal 110 (S11). To indicate that the talk burst permission is already granted to the first PTT terminal, the PTT server transmits a talk burst indication message (e.g., talk burst taken message) to the second PTT terminal 120 and the third PTT terminal 130 to indicate that the talk burst is taken (S12).

In an exemplary embodiment, the second PTT terminal 120 may successfully receive the talk burst taken message and recognize that the first PTT terminal 110 has been given the talk burst permission. However, the talk burst taken message transmitted to the third PTT terminal 130 may be lost. Thus, the third PTT terminal 130 will fail to recognize that the talk burst permission is granted to the first PTT terminal 110.

Once the first PTT terminal 110 receives the talk burst permission from the PTT server 200, the first PTT terminal 110 communicates data inputted by a user to the PTT server 200 in a RTP packet (S13). The PTT server 200 receives the RTP packet from the first PTT terminal 110 and changes the identification data of the PTT server 200 to the identification data of the first PTT terminal 110 in the SSRC field of the RTP packet (S14).

The PTT server 200 then transmits the RTP packet having the new identification data to the second PTT terminal 120 and the third PTT terminal 130 (S15). The second PTT terminal 120 receives the RTP packet and displays information of the first PTT terminal 110, which is included in the talk burst, so that a user can recognize the sender (S16).

If the third PTT terminal 130 fails to receive the talk burst and only receives the RTP packet, the PTT terminal 130 transmits a talk burst inquiry to the PTT server 200. This talk burst inquiry corresponds to the SSRC field value of the RTP packet (S17). The PTT server 200 after receiving the talk burst inquiry, transmits a talk burst taken message to the third PTT terminal 130 (S18).

Accordingly, when voice and data are transmitted using a RTP packet, the PTT server 200 changes an identification data of a transmission terminal stored in a SSRC field into identification data of PTT server and transmits the RTP packet including the changed identification data to each PTT terminal. The PTT server also manages all terminals among which sessions are established.

In a preferred embodiment, if a talk burst control message is lost or it is determined that a received talk burst control message does not correspond to a present state of a PTT terminal, the PTT terminal transmits a talk burst inquiry to the PTT sever. The PTT server may also transmit one or more of the following messages, such as, a talk burst taken, a talk burst granted, and a talk burst idle to the PTT terminal according to the state of the PTT terminal and depending on system implementation.

It is noteworthy that the PTT system and method for optimizing talk burst control can be applied to a case where the received talk burst is lost and other circumstances where the received talk burst control message does not correspond to a current state of the terminal, for example.

Thus, the PTT server manages and processes information of one or more terminals that communicate with one another over established communication sessions. This minimizes memory consumption of the PTT terminal and also reduces the load needed for processing the information.

Figure 3:
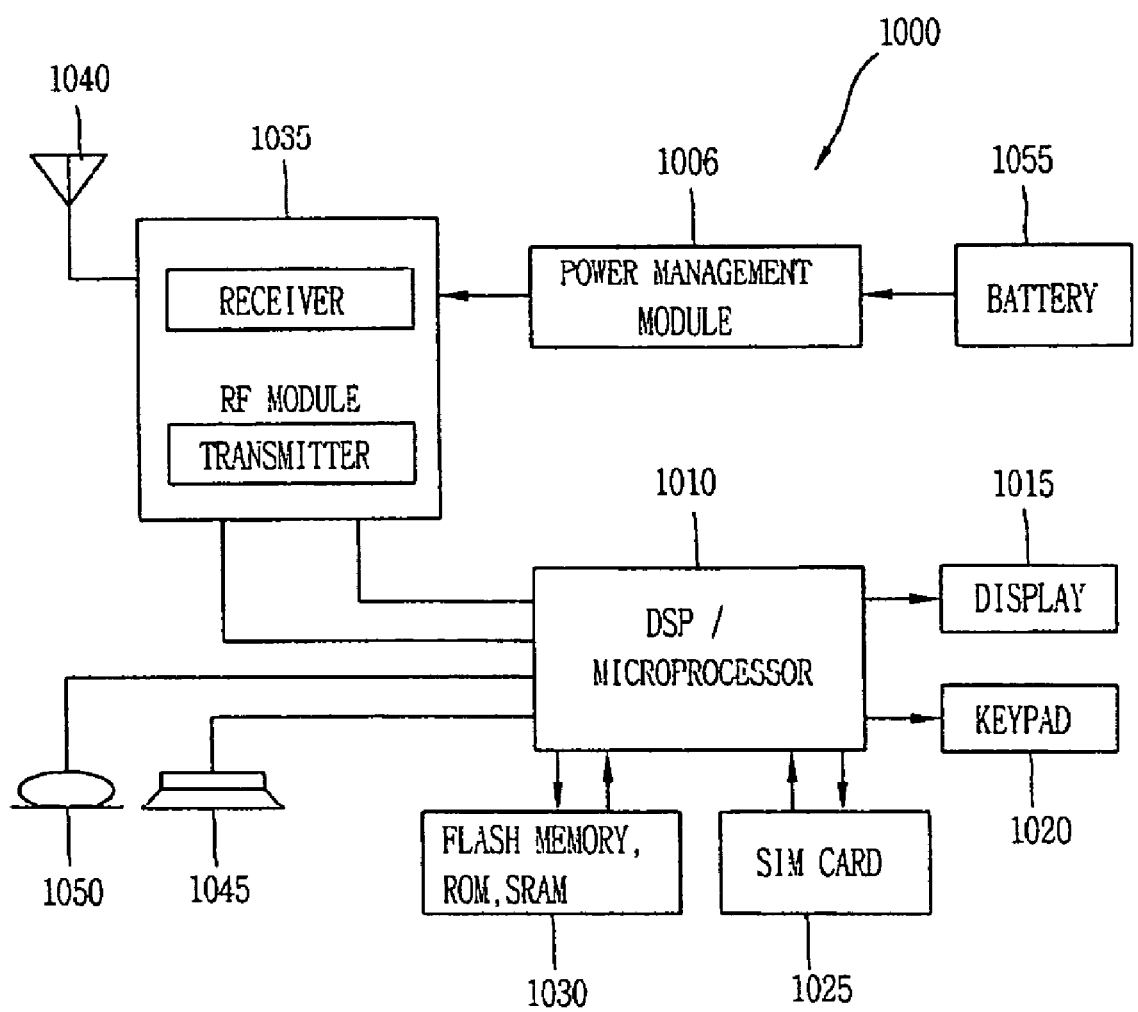
FIG. 3 is a block diagram of an exemplary PTT terminal in accordance with one embodiment of the invention.

Referring to FIG. 3, a block diagram of a PTT terminal 1000 of an exemplary embodiment of the present invention is illustrated. The mobile communication device 1000 may comprise at least one of a processing unit 1100, such as a microprocessor or digital signal processor, an RF module 1350, a power management module 1050, an antenna 1400, a battery 1550, a display 1150, a keypad 1200, a storage unit 1300 such as flash memory, ROM or SRAM, a speaker 145 and a microphone 1500.

A user enters instructional information, for example, by pushing the buttons of a keypad 1200 or by voice activation using the microphone 1500. The processing unit 1100 receives and processes the instructional information to perform the appropriate function, such as to communicate a message. Operational data may be retrieved from the storage unit 130 to perform the function. Furthermore, the processing unit 1100 may display the instructional and operational information on the display 1150 for the user's reference and convenience.

The processing unit 1100 issues instructional information to the RF module 1350, to initiate communication (e.g., transmit radio signals comprising voice communication data). The RF module 1350 comprises a receiver and a transmitter to receive and transmit radio signals, respectively. The antenna 1400 facilitates the transmission and reception of radio signals. Upon receiving radio signals, the RF module 1350 may forward and convert the signals to baseband frequency for processing by the processing unit 1100. The processed signals would be transformed into audible or readable information outputted via the speaker 1450, for example.

The processing unit 1100 is adapted to store message history data of messages received from and messages transmitted to other users in the storage unit 1300, receive a conditional request for message history data input by the user, process the conditional request to read message history data corresponding to the conditional request from the storage unit, and output the message history data to the display unit

1150. The storage unit 1300 is adapted to store message history data of the received messages and the transmitted messages.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. For example, while processors, controllers and other circuits, are described in terms of specific logical/functional circuitry relationships, one skilled in the art will appreciate that same may be implemented in a variety of ways as appropriately configured and programmed processors, ASICs (application specific integrated circuits), and DSPs (digital signal processors). These and various other adaptations, alternatives, modifications, variations and combinations of features of the embodiments disclosed are within the scope of the invention. The invention is defined by the claims and their full scope of equivalents.

What is claimed is:

1. A method for optimizing talk burst control in a push-to-talk (PTT) communication network by a first PTT terminal that has lost a talk burst control message, the method comprising:
    transmitting a talk burst inquiry to a PTT server requesting the talk burst control message to determine a talk burst state of the first PTT terminal;
    receiving from the PTT server the talk burst control message providing the talk burst state of the first PTT terminal, in response to the talk burst inquiry; and
    receiving a real time protocol (RTP) packet transmitted by a second PTT terminal,
    wherein the talk burst control message notifies the other PTT terminals that the second PTT terminal has obtained the permission to send the talk burst,
    wherein the talk burst control message comprises identity of the second PTT terminal,
    wherein the RTP packet comprises a synchronization source (SSRC) field, and
    wherein the talk burst inquiry is transmitted by the first PTT terminal, when the first PTT terminal receives a communication from the second PTT terminal without having received the talk burst control message from the PTT server.

2. The method of claim 1, wherein the RTP packet is processed by the PTT server before the RTP packet is received by the first PTT terminal, so that the SSRC field of the RTP packet is changed by the PTT server from a first value to a second value.

3. The method of claim 2, wherein the first value is an identification generated by the PTT server.

4. The method of claim 2, wherein the second value is the identity of the second PTT terminal.

5. The method of claim 1, wherein the talk burst inquiry is transmitted by the first PTT terminal, when the first PTT terminal receives a communication from the second PTT terminal.

6. A method for optimizing talk burst control in a push-to-talk (PTT) communication network by a PTT server, the method comprising:
    receiving a talk burst inquiry from a first PTT terminal requesting a talk burst control message to determine a talk burst state of the first PTT terminal; and
    transmitting to the first PTT terminal the talk burst control message providing the talk burst state of the first PTT terminal, in response to the talk burst inquiry,
    wherein the talk burst control message notifies the other PTT terminals that a second PTT terminal has obtained the permission to send the talk burst, and
    wherein the talk burst inquiry is transmitted by the first PTT terminal, when the first PTT terminal receives a communication from the second PTT terminal without having received the talk burst control message from the PTT server.

7. The method of claim 6, wherein the talk burst control message comprises identity of the second PTT terminal.

8. The method of claim 7, further comprising:
    sending to the first PTT terminal a real time protocol (RTP) packet transmitted by the second PTT terminal.

9. The method of claim 8, wherein the RTP packet comprises a synchronization source (SSRC) field.

10. The method of claim 9, wherein the RTP packet is processed by the PTT server before the RTP packet is received by the first PTT terminal, so that the SSRC field of the RTP packet is changed by the PTT server from a first value to a second value.

11. The method of claim 10, wherein the first value is an identification generated by the PTT server.

12. The method of claim 10, wherein the second value is the identity of the second PTT terminal.

13. The method of claim 6, wherein the talk burst inquiry is transmitted by the first PTT terminal, when the first PTT terminal receives a communication from the second PTT terminal.

14. A push-to-talk (PTT) terminal in a PTT communication network, the PTT terminal comprising:
    a transmitter for transmitting a talk burst inquiry to a PTT server requesting a talk burst control message to determine a talk burst state of a first PTT terminal; and
    a receiver for receiving from the PTT server the talk burst control message providing the talk burst state of the first PTT terminal, in response to the talk burst inquiry,
    wherein the talk burst control message notifies the other PTT terminals that a second PTT terminal has obtained the permission to send the talk burst, and
    wherein the talk burst inquiry is transmitted by the first PTT terminal, when the first PTT terminal receives a communication from the second PTT terminal without having received the talk burst control message from the PTT server.

15. The PTT terminal of claim 14, wherein the talk burst control message comprises identity of the second PTT terminal.

16. The PTT terminal of claim 15, wherein the receiver is further used for receiving a real time protocol (RTP) packet transmitted by the second PTT terminal.

17. The PTT terminal of claim 16, wherein the RTP packet comprises a synchronization source (SSRC) field.

18. The PTT terminal of claim 17, wherein the RTP packet is processed by the PTT server before the RTP packet is received, so that the SSRC field of the RTP packet is changed by the PTT server from a first value to a second value.

19. The PTT terminal of claim 18, wherein the first value is an identification generated by the PTT server.

20. The PTT terminal of claim 18, wherein the second value is the identity of the second PTT terminal.

21. The PTT terminal of claim 14, wherein the talk burst inquiry is transmitted, when a communication from the second PTT terminal is received.

22. A method for optimizing talk burst control in a push-to-talk (PTT) communication network by a first PTT terminal that has lost a talk burst control message, the method comprising:

receiving from a first PTT terminal a communication that does not correspond to the talk burst state of the first PTT terminal;

transmitting to a PTT server a talk burst inquiry requesting the talk burst control message to update the talk burst state of the first PTT terminal; and receiving the talk burst control message updating the talk burst state of the first PTT terminal from the PTT server, in response to the talk burst inquiry, wherein the talk burst control message notifies the other PTT terminals that a second PTT terminal has obtained the permission to send the talk burst, and wherein the talk burst inquiry is transmitted by the first PTT terminal, when the first PTT terminal receives a communication from the second PTT terminal without having received the talk burst control message from the PTT server.

23. The method of claim 22, wherein the communication is transmitted by the second PTT terminal over a real time protocol (RTP).

24. The method of claim 22, wherein the communication is transmitted by the second PTT terminal over a user datagram protocol (UDP).

25. The method of claim 22, wherein the PTT communication network is a cellular network.

* * * * *